US011959322B2

(12) United States Patent
Hooke

(10) Patent No.: US 11,959,322 B2
(45) Date of Patent: Apr. 16, 2024

(54) SEALING ASSEMBLY

(71) Applicant: Anthony Innovations Pty Ltd., Thomastown (AU)

(72) Inventor: Oscar Humphrey Richard Hooke, Thomastown (AU)

(73) Assignee: Anthony Innovations Pty Ltd., Thomastown (AU)

(*) Notice: Subject to any disclaimer, the term of this patent is extended or adjusted under 35 U.S.C. 154(b) by 0 days.

(21) Appl. No.: 17/881,815

(22) Filed: Aug. 5, 2022

(65) Prior Publication Data

US 2023/0085323 A1 Mar. 16, 2023

(30) Foreign Application Priority Data

Aug. 6, 2021 (AU) ................................ 2021902434

(51) Int. Cl.
*E05D 15/00* (2006.01)
*E05D 15/56* (2006.01)

(52) U.S. Cl.
CPC .................................. *E05D 15/565* (2013.01)

(58) Field of Classification Search
CPC .................................................. E05D 15/565
See application file for complete search history.

(56) References Cited

U.S. PATENT DOCUMENTS 7,971,392 B2 * 7/2011 Seo ....................... E05D 15/565 49/221
9,458,656 B2 * 10/2016 Mickelson ............ E05D 15/565
2004/0163317 A1 * 8/2004 Reich .................... E05D 15/565 49/226
2009/0013605 A1 * 1/2009 Seo ....................... E05D 15/565 49/350
2010/0307064 A1 * 12/2010 Lambertini ........... E05D 15/565 49/427

FOREIGN PATENT DOCUMENTS

KR 101372577 * 3/2014
WO WO-2007073027 A1 * 6/2007 ............. E05B 63/20
WO WO-2013032300 A2 * 3/2013 ........... E05D 15/565

* cited by examiner

*Primary Examiner* — Daniel J Troy
*Assistant Examiner* — Daniel Alvarez
(74) *Attorney, Agent, or Firm* — David L. Nocilly; Bond Schoeneck & King PLLC

(57) ABSTRACT

Disclosed herein is a sealing assembly for moving a slidable panel for engagement with and disengagement from sealing means, the sealing assembly comprising a linkage assembly which connects a handle and at least one roller assembly having roller wheels, the sealing assembly being configured to be adjustable, by manipulation of the handle, such that the at least one roller assembly and the slidable panel supported thereby are movable between a first position where the slidable panel is in contact with sealing means thereby providing weatherproofing and a second position where the slidable panel is free of the sealing means and the panel is able to move freely relative to an outer frame, and wherein the linkage assembly is configured to as to provide a variable force through the handle when the at least one roller assembly and supported panel is moved between the first and second positions.

19 Claims, 10 Drawing Sheets

SEALING ASSEMBLY

FIELD OF THE INVENTION

The present invention generally relates a sealing assembly for engagement and disengagement of a slidable door from sealing means such as weather-proofing. The present invention also relates to a roller assembly used in the sealing assembly and a kit comprises components of the sealing assembly.

BACKGROUND TO THE INVENTION

Conventional roller assemblies for sliding panels have roller wheels within carriages that are located within a cavity of the panel. These assemblies will typically have two roller wheel carriages, with one located towards the lower front corner and one towards the lower rear corner of the sliding panel.

As these sliding panels typically form external sliding doors and window weatherproofing is essential. Traditional roller assemblies fit within the cavity in the lower rail of the panel, with weather sealing between the door panel and the outer frame of the opening to provide this weather-proofing. One disadvantage is that the weather sealing is the largest factor in the rolling resistance of sliding door and sliding window systems requiring more force in operation for a user and increases wear and tear on the components.

A method of reducing this contact with weather seals during operation is by use of an espagnolette linkage connected between the door handle and door rollers. Turning the door handle 180° will cause the door rollers to lift via an internal adjustment mechanism, thereby removing contact between the weather seals and the door frame during operation. Existing methods of internal adjustment use a ramp feature to remove weather seal contact. This ramp method has a constant handle force through the adjustment range. This ramp method also relies on the roller being maintained in the lifted position through an over-centre locking mechanism within the espagnolette handle assembly. This requires that the espagnolette linkage system is loaded with the mass of the panel for the duration of the time the panel is in the raised position. This constant load on the linkage system causes wear and tear on the components and therefore reduces the product lifespan.

A problem with existing sliding door and window rollers is that for even load distribution between rollers within the panel, the load must be applied between only two equidistant positions. In a system with only two wheels, these points are usually the axles. When loads increase, additional wheels are required to support the increased load, which then requires additional mechanisms to ensure the load is still applied through the two equidistant positions. These additional mechanisms increase in complexity as door loads increase and quantity of wheels required increases. Increasing the complexity of the mechanism increases costs.

It is desirable for embodiments of the present invention to address at least partially one or more of the disadvantages of the methods or systems above. Further it is preferred that embodiments of the present invention advantageously provide a method and/or system of reducing contact between weather seals and frames during panel movement which reduces load on the components and/or operating force. It is also preferred that embodiments of the present invention also produce a system which can accommodate a wide range of sliding doors and windows having different weights.

It is to be understood that, if any prior art publication is referred to herein, such reference does not constitute an admission that the publication forms a part of the common general knowledge in the art, in Australia or any other country.

SUMMARY OF THE INVENTION

According to an aspect of the present invention there is provided a sealing assembly for moving a slidable panel for engagement with and disengagement from sealing means, the sealing assembly comprising a linkage assembly which connects a handle and at least one roller assembly having roller wheels, the sealing assembly being configured to be adjustable, by manipulation of the handle, such that the at least one roller assembly and the slidable panel supported thereby are movable between a first position where the slidable panel is in contact with sealing means thereby providing weatherproofing and a second position where the slidable panel is free of the sealing means and the panel is able to move freely relative to an outer frame, and wherein the linkage assembly is configured to as to provide a variable force through the handle when the at least one roller assembly and supported panel is moved between the first and second positions.

Preferably, the first position is a lowered position of slidable panel in which the roller wheels of the at least one roller assembly are retracted into said roller assembly, and the second position is a raised position of the slidable panel in which the roller wheels are extended partly out of the roller assembly. More preferably, in the lowered position a body of or each roller assembly is forced onto the sealing means by the sliding panel, and in the raised position the body of the at least one roller assembly is free of the sealing means. In an embodiment, the movement between the first and second positions is provided by a pair of bell crank linkage arrangements having a vertical rod member connected therebetween. Preferably, the at least one roller assembly has a housing and a roller sub-assembly which carries at least one roller wheel and which is configured to move pivotally relative to the housing, and the bell crank linkage arrangements comprise an upper bell crank linkage which connects an upper end portion of the rod member to the handle and a lower bell crank linkage which connects the lower end portion of the rod member to the roller sub-assembly.

In an embodiment, the lower bell crank linkage comprises a linkage member which is pivotally movable about a pivot point, the linkage member having a connection at one end to the rod member, and a connection at its other end to the roller sub-assembly. The lower bell crank linkage is preferably arranged such that, when the linkage member is pivoted about the pivot point, the connection of the linkage member to the roller sub-assembly moves through a non-linear path to provide a substantially sinusoidal force gradient. More preferably, the pivot point of the lower bell crank linkage is configured to be at different distances from the connections to the rod member and to the roller sub-assembly. Even more preferably, the distance between the connection to the rod member and the pivot point is substantially twice the distance between the connection to the roller sub sub-assembly and the pivot point.

Preferably, in the raised position the connection point of the lower bell linkage to the roller sub-assembly is substantially in vertical alignment with the pivot point.

The assembly can comprise a plurality of roller assemblies, wherein a first roller assembly of the plurality of roller assemblies is a master roller assembly connected to the linkage assembly, and a second roller assembly of the plurality of roller assemblies is a slave roller assembly connected to the master roller assembly by a linking means such that movement between the positions of the master roller assembly effects a similar movement of the slave roller assembly, and wherein the master and slave roller assemblies are spaced apart and mountable in the recess of a sill for support of the slidable panel. Preferably, the linking means for connecting the master roller assembly to the slave roller assembly is a linkage bar or rod.

In an embodiment, the at least one roller assembly comprises an outer housing which is engageable with the sealing means in the first, lowered position, and an inner member movable within the outer housing and which carries the at least one roller sub-assembly.

Preferably, the inner member is connected to the outer housing such that the inner member is movable in vertical and horizontal directions relative to the outer housing upon pivotal movement of the lower bell crank linkage. In one embodiment, the connection between the inner member and the outer housing comprises at least one pivoting swing arm. In another embodiment, the connection between the inner member and the outer housing comprises at least one pivot pin received in at least one inclined slot in the outer housing.

In an embodiment, the at least one roller assembly is of elongate form and carries a plurality of roller sub-assemblies.

The at least one roller assembly can include a first roller sub-assembly connected to a second roller sub-assembly such that movement between positions of the first roller sub-assembly effects a similar movement of the second roller sub-assembly. The or each roller sub-assembly may be configured to hold two roller wheels in edge-to-edge configuration, each roller wheel being carried by a respective pivotal arm. One or the other of the two roller wheels in the roller sub-assembly can be configured so as to be removable and/or replaceable for adjustment of load distribution. Preferably, the pivotal arms of the sub-assembly or sub-assemblies extend outwardly from each other such that they pivot in a vertical plane about a common pivot point and wherein each arm has a suspension means located at an opposite end portion of said arm from the common pivot point.

The or each sub-assembly can be configured to hold four roller wheels in edge-to-edge configuration, each roller wheel being carried by a respective arm and having suspension means at the opposite end portion of each said respective arm from a pivotal attachment. Preferably, the suspension means is a spring. More preferably, the suspension means is a coil spring.

The at least one roller sub-assembly for suspending at least one roller wheel can be removable and/or replaceable.

BRIEF DESCRIPTION OF THE DRAWINGS

One or more embodiments of the present invention will hereinafter be described with reference to the accompanying Figures, in which.

DETAILED DESCRIPTION OF THE DRAWINGS

Figure 1:
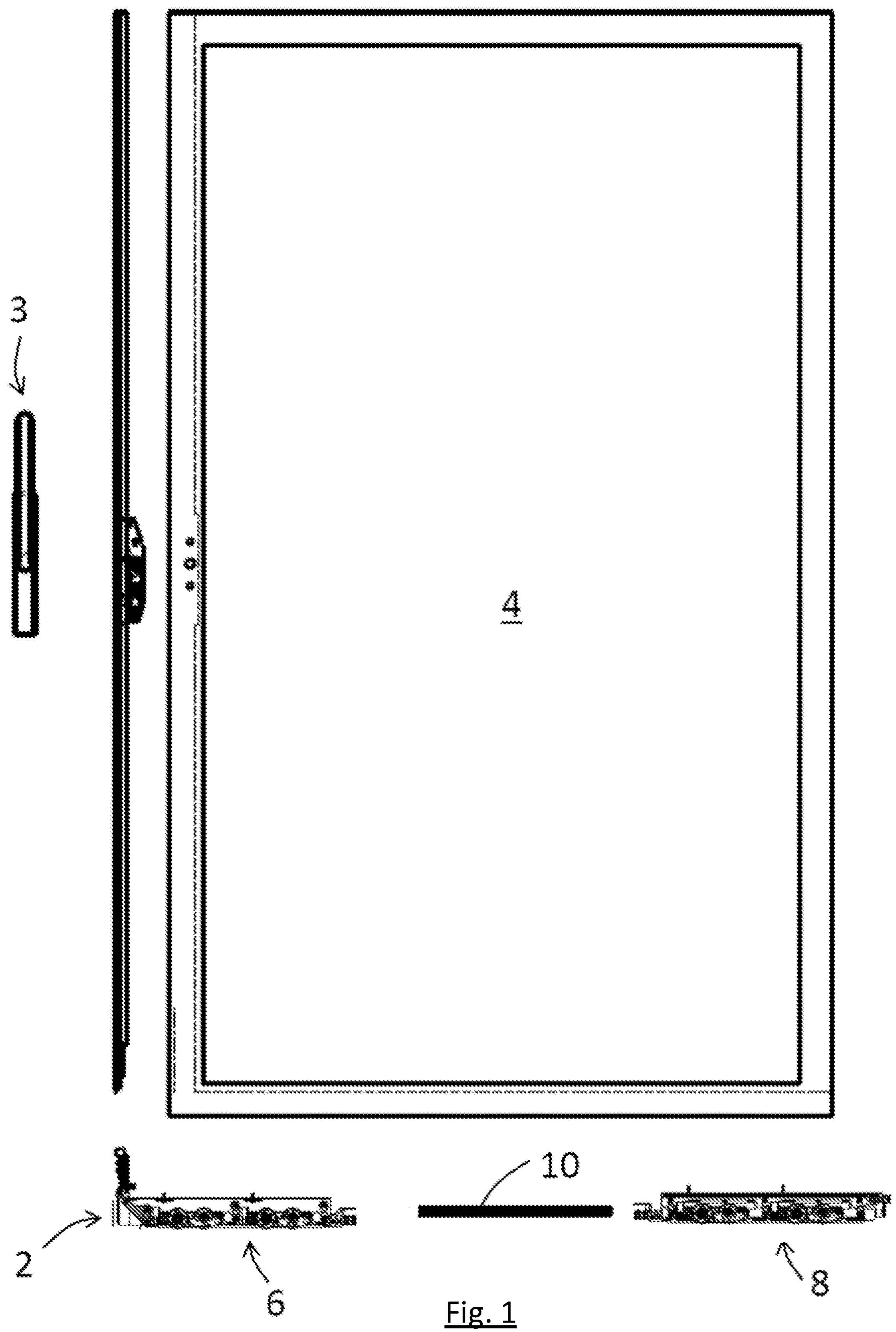
FIG. 1 is a front view of a sealing assembly for a slidable panel having a first and second roller assemblies in exploded form according to a preferred embodiment of the present invention.

Referring now to FIGS. 1 to 18, there is illustrated a sealing system and assembly 2 according to preferred embodiments of the present invention for use with a sliding panel 4 as shown in FIG. 1. The sliding panel 4 can be a sliding door or window. In the illustrated example of FIG. 1, the sealing system has a pair of spaced apart first and second roller assemblies 6, 8 connected by linkage means 10 and which are configured to support the sliding panel 4 *r* at opposite lower ends of the panel 4 by being slidably mountable in a recessed sill of the door or window frame (not shown). Sealing means (not shown), in the form of weather sealing typically used for sealing doors and windows, is provided between the panel 4 and the outer door or window frame (not shown) of the opening.

Figure 2:
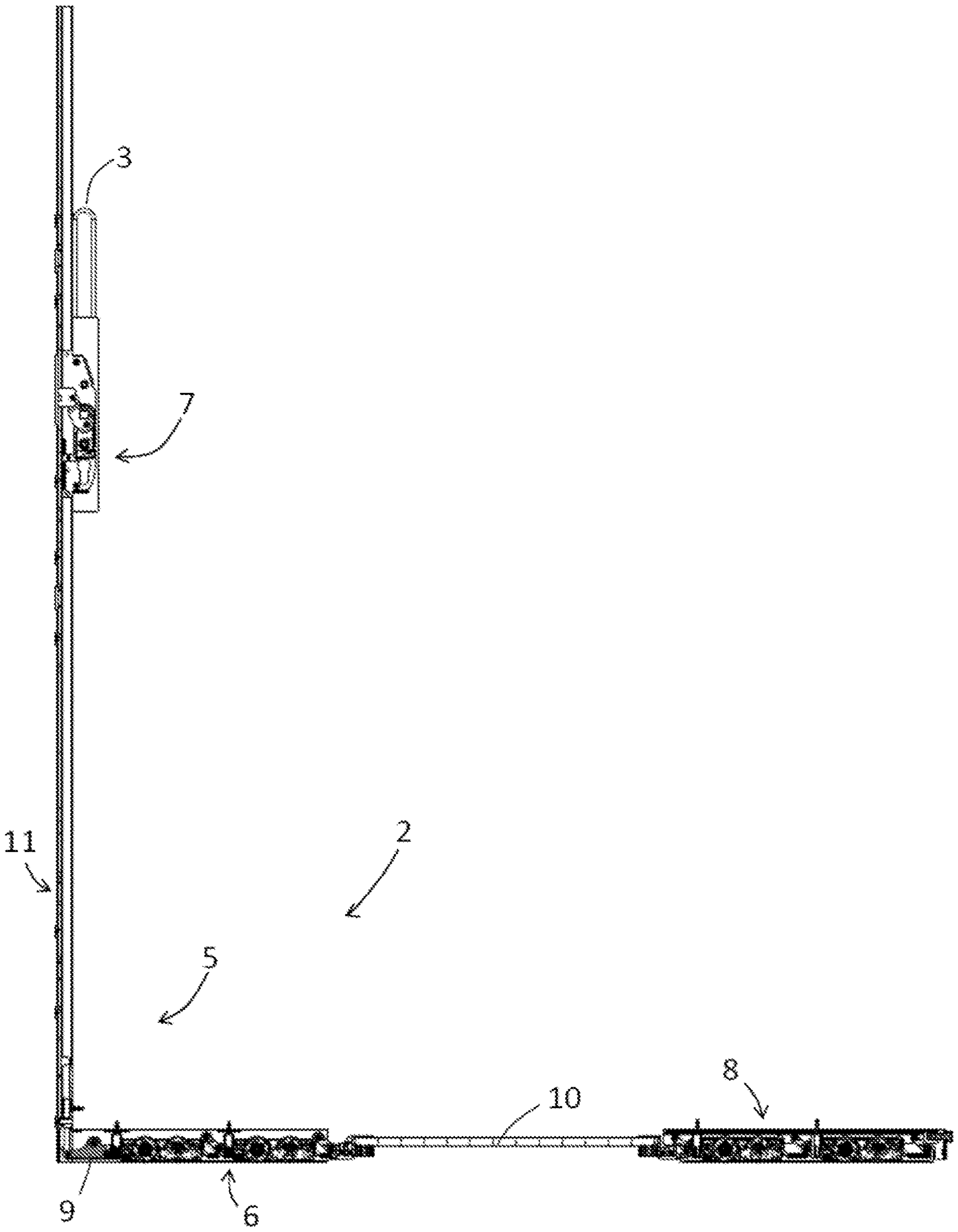
FIG. 2 is a cross-section view of the sealing assembly in a retracted configuration.
Figure 3:
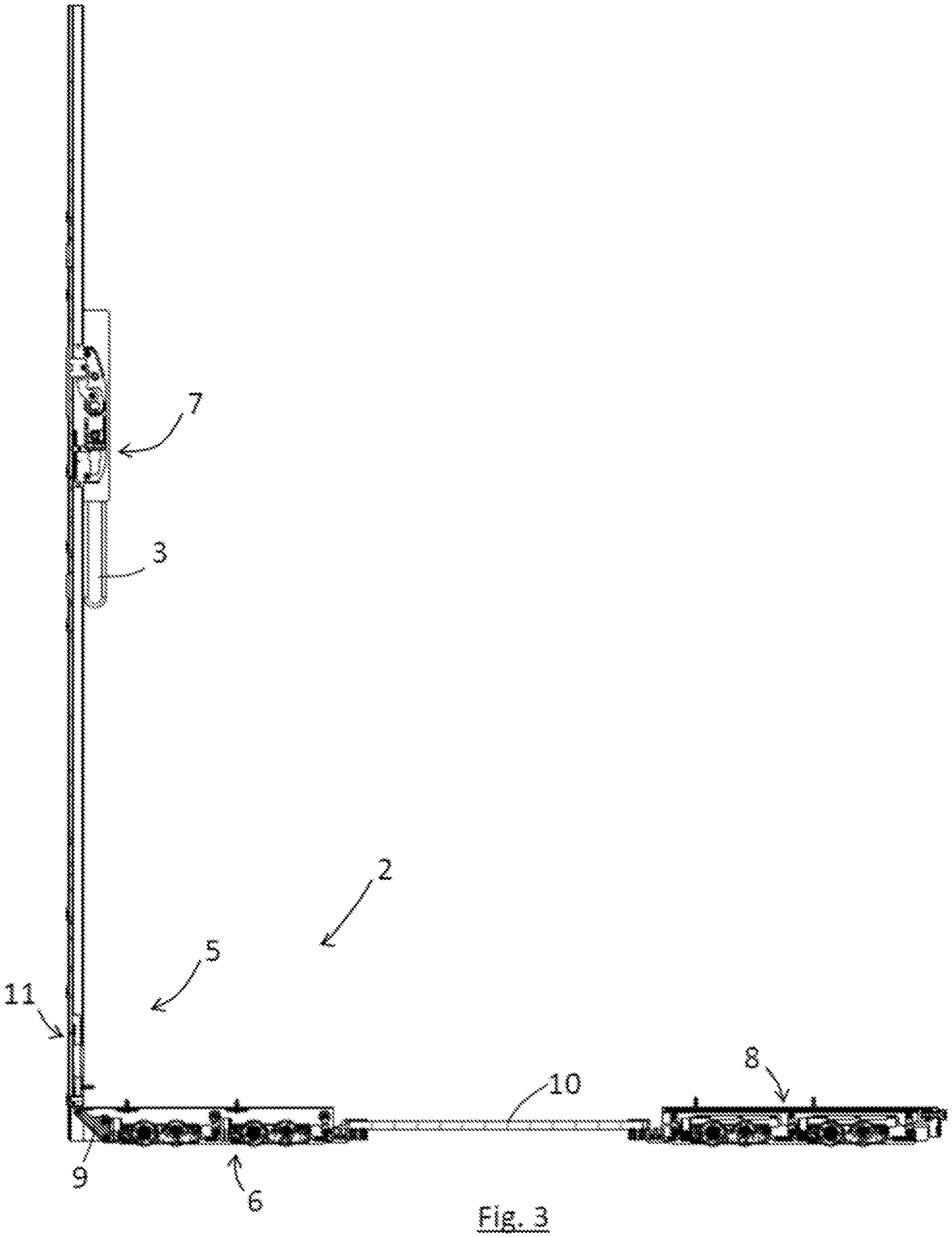
FIG. 3 is a cross-section view of the sealing assembly in an extended configuration.
Figure 4:
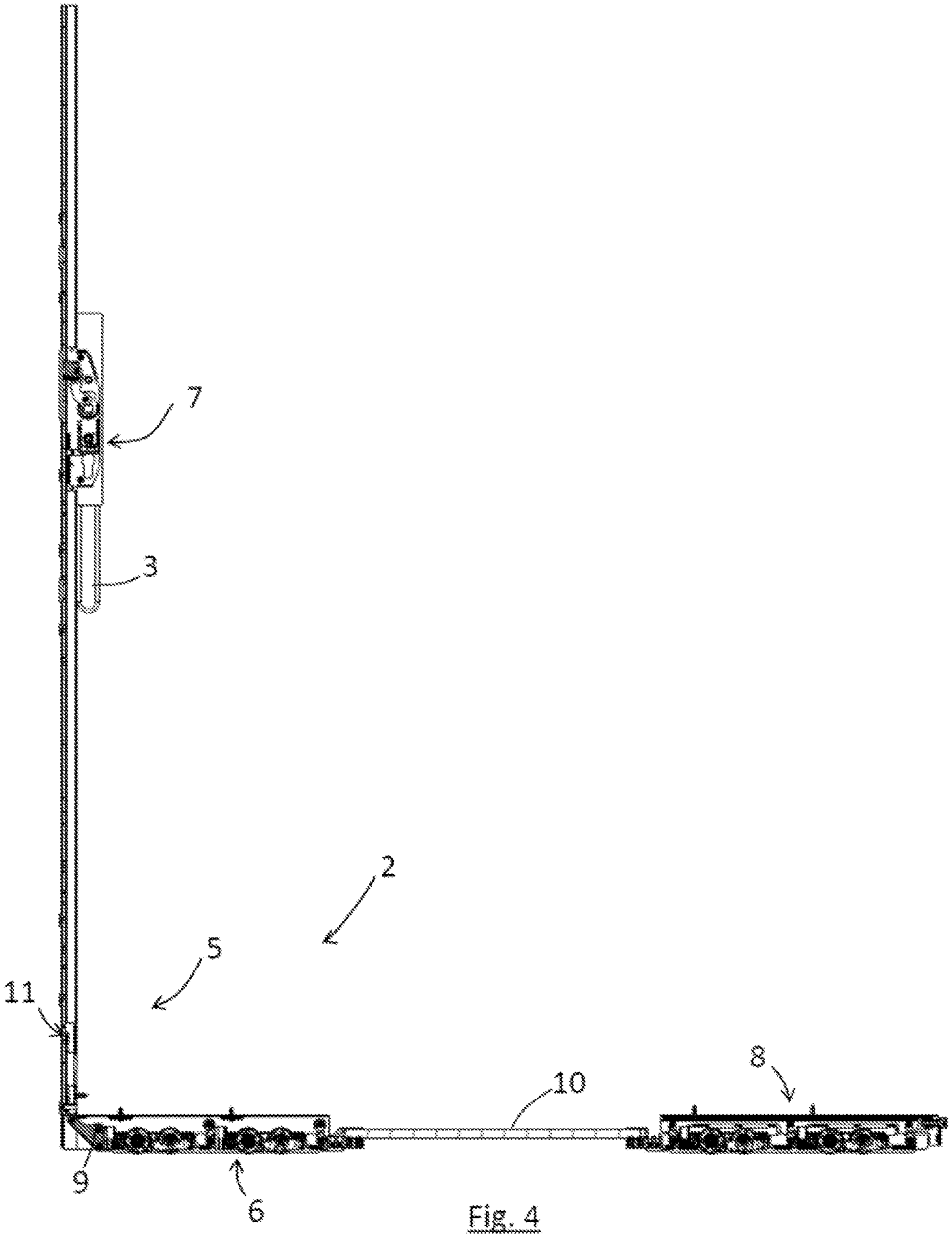
FIG. 4 is a cross-section view of the sealing assembly in an extended and loaded configuration.
Figure 5:
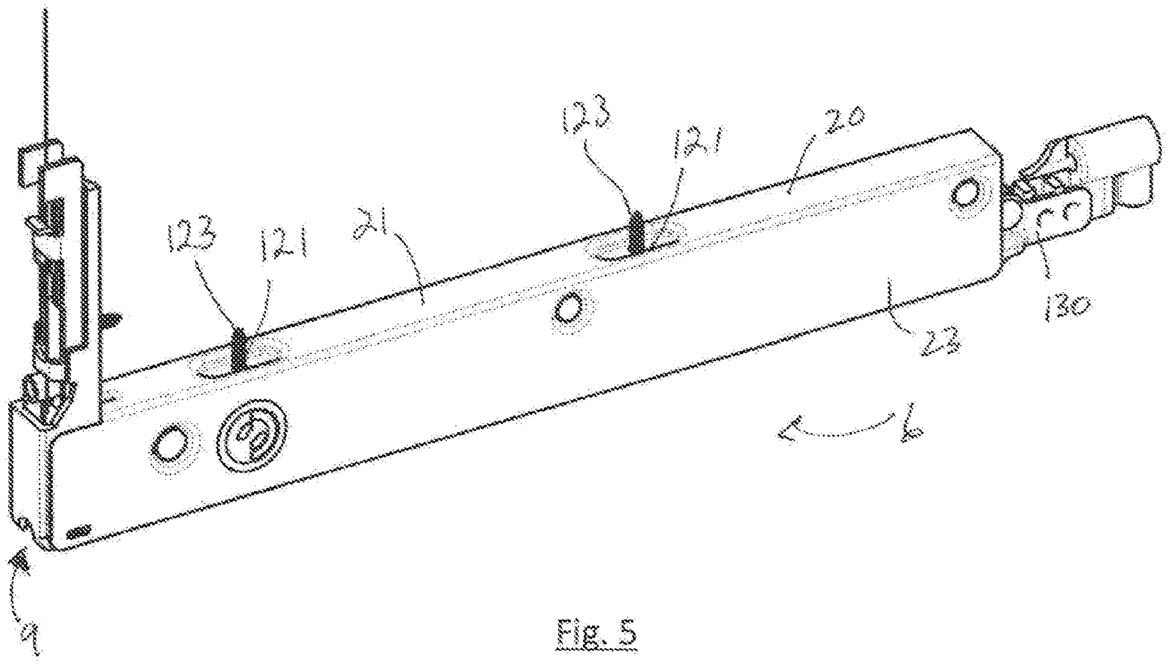
FIG. 5 is a perspective view of a first roller assembly.
Figure 6:
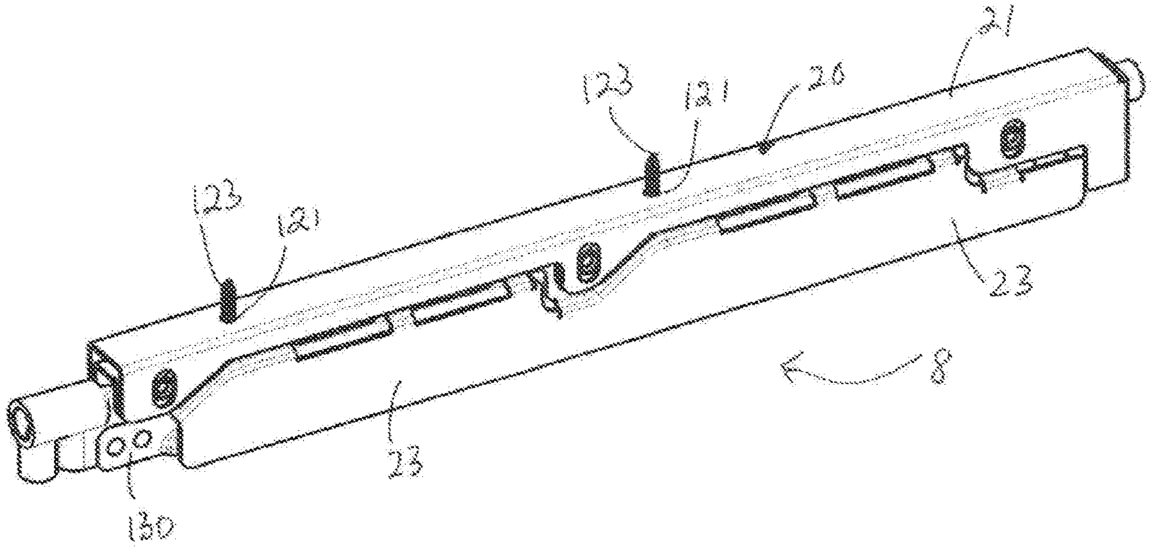
FIG. 6 is a perspective view of a second roller assembly.
Figure 7:
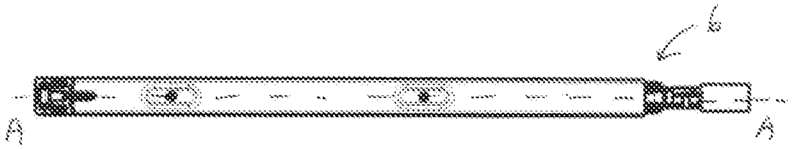
FIG. 7 is a top view of the first roller assembly of FIG. 5.

In FIGS. 2 to 4, there are shown various views of the sealing assembly which comprises a handle 3, the pair of roller assemblies 6, 8, and a linkage assembly 5 which connects the handle 3 to the roller assemblies 6, 8. In most cases, the first roller assembly of the pair is a master roller assembly 6 with the other being a slave roller assembly 8 with the linkage means 10 therebetween. The sealing assembly 2 is configured such that roller assemblies 6, 8, and the slidable panel 4 supported thereon, can be moved between two positions by manipulation of the handle 3. In a retracted position shown in FIG. 2, the roller assemblies are retracted and the slidable panel 4 is in contact with the sealing means thereby weather proofing the external environment from the interior of a building. In an extended position shown in FIGS. 3 and 4, the roller assembles are extended such that the slidable panel 4 is free of the sealing means and the panel 4 is able to move freely with respect to the outer frame for ease of use during operation of the slidable panel.

Figure 14:
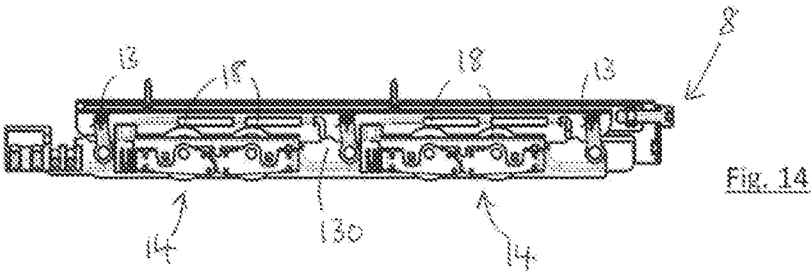
FIG. 14 is a cross-section view of the second roller assembly of FIG. 12 in an extended and loaded configuration.
Figure 15:
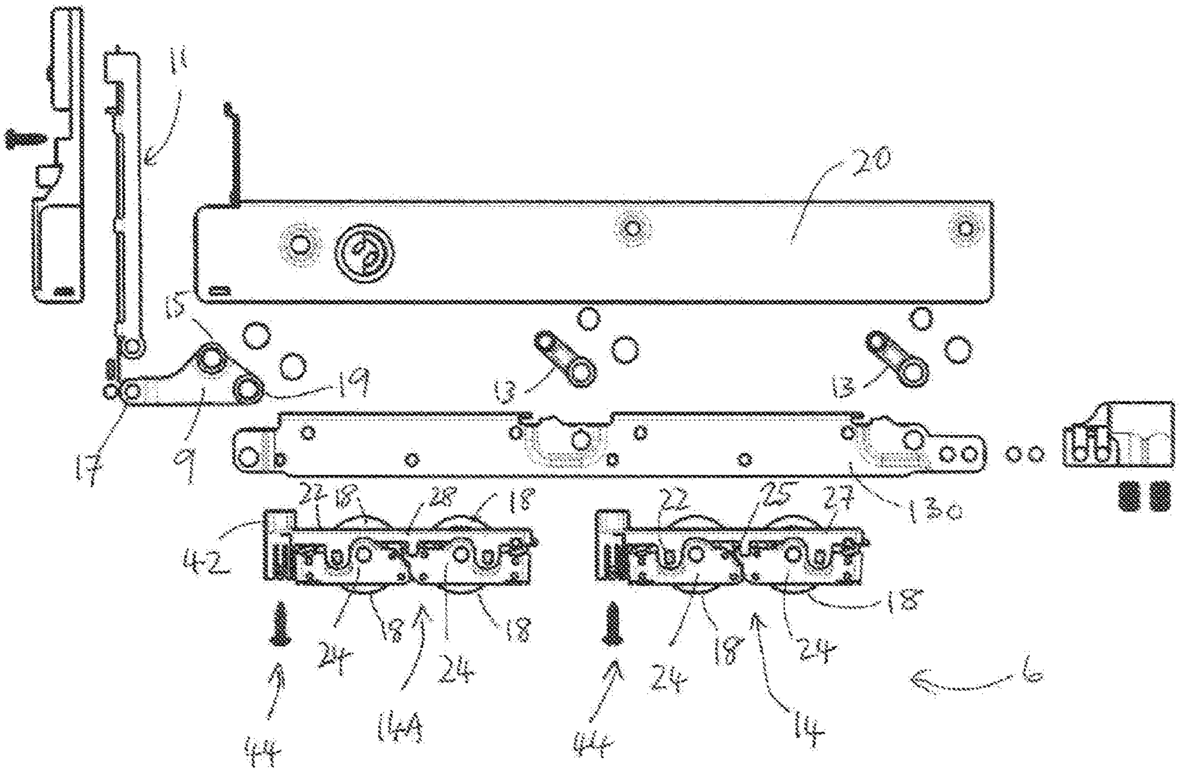
FIG. 15 is an exploded view of the first roller assembly of FIG. 5.
Figure 16:
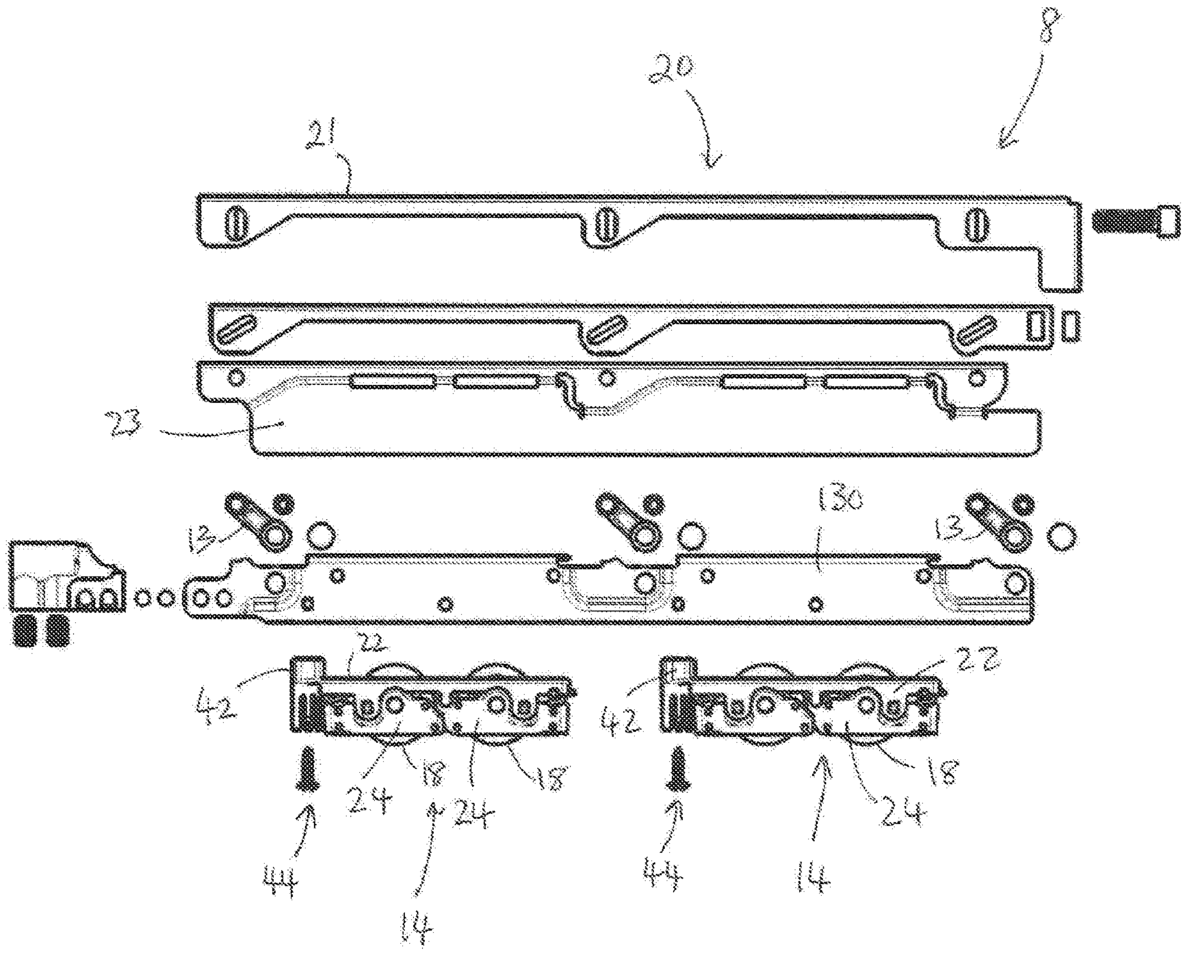
FIG. 16 is an exploded view of the second roller assembly of FIG. 6.

As shown in the embodiments illustrated in FIGS. 2 to 14, the sealing assembly 2 is shown with the roller assemblies 6, 8 in various configurations: retracted, extended, loaded and unloaded. The extended, loaded condition shown in FIGS. 4, 10 and 14 is where the roller assemblies 6, 8 support the weight of the slidable panel, and the loaded condition is shown with optimal weights for the relevant roller assembly. The roller assemblies 6, 8 are able to be movable into retracted and extended positions by manipulation of the handle 3 and linkage assembly 5 which can adjust the height of the panel 4 carried by the roller assemblies 6, 8 to bring the panel frame into and out of frictional contact with the weather seals.

The first roller assembly 6 shown in FIGS. 5, 7 to 10 and 15, is a master roller assembly. The master roller assembly 6 has a U-shaped outer housing 20 with an upper surface 21 and downwardly extending side walls 23. The outer housing 20 contains at least one roller sub-assembly 14, 14A for supporting at least one roller wheel 18. The outer housing 20 defines an internal volume which is sized to receive the roller sub-assemblies 14, 14A for protection and further provides an aesthetic covering.

The second roller assembly 8, shown in FIGS. 6, 11 to 14 and 16, is a slave roller assembly. The slave roller assembly 8 has an outer housing comprising an upper housing part with an upper surface 21 and a lower housing part with downwardly extending side walls 23, The lower housing part supports at least one roller sub-assembly 14 that has at least one roller wheel 18.

The upper surface 21 of the housing 20 is provided with a pair of openings 121 through which attachment means 123, such as screws, extend for securing the lower surface of the panel 4 to the roller assembly 6.

The linkage assembly 5 is similar to that of an espagnolette linkage and comprises a pair of connected upper and lower bell crank linkage arrangements 7, 9 a vertical rod member 11 at opposing end portions of as illustrated most particularly in FIGS. 2 to 4. The linkage assembly 5 allows an operator to rotate the handle 3 to effect movement of the sub-assemblies 14, 14A of the master and slave roller assemblies 6, 8 between their retracted and extended positions. In one position, illustrated in FIGS. 2, 8 and 12, the roller wheels 18 are retracted into the outer housing 20 and the lower housing part 22 so that the roller assemblies 6, 8 are in in contact with the sealing means. In the other position, the roller wheels 18 of the roller assemblies 4, 6 are extended such that the roller wheels 18 protrude beyond the outer housing 20 and the lower housing part 22 to raise the panel 4 so that it is free of the sealing means and the panel 4 can slide freely on the roller wheels 18 within the sill of the door or window frame.

The upper bell crank linkage arrangement 7 is connected to the handle 3 and to the upper end of the vertical rod member 11 such that rotation of the handle 3 through 180 degrees between the upper position shown in FIG. 2 and the lower position shown in FIGS. 3 and 4 effects vertical movement of the rod member 11. One end of the lower bell crank linkage 9 is connected at connection point 17 to the lower end of the rod member 11 with its other end 19 connected to the sub-assembly 14A of the master roller assembly 6. Thus, as the handle 3 is rotated, through 180°, from a position where the handle 3 is directed substantially upwardly as shown in FIG. 2, and a position where the handle 3 is directedly substantially downwardly, as shown in FIGS. 3 and 4, the linkage assembly 5 causes the rod member 11 to move upwardly to cause the lower bell crank linkage to pivot about pivot point 15 so that the roller sub-assemblies 14, 16 move from the a retracted position (FIGS. 2, 8 and 12) for sealing of the panel assembly into the extended position (FIGS. 3, 9 and 13) so that the panel 4 can slide freely on the extended roller wheels 18.

The master and slave roller assemblies 6, 8 are shown in greater detail in FIGS. 5 to 16 according to one embodiment of the present invention. The roller sub-assemblies 14 of the master and slave roller assembly, other than the driven sub-assembly 14A, are all supported by pivoting swing arms 13 from an elongate inner member 130 of each roller assembly which is movable within the outer housing 20 so that all the sub-assemblies 14A, 14, 16 move in unison when the sub-assembly 14A of the master roller assembly 6 is driven between the two positions by the linkage assembly 5. In the master roller assembly 6, the swing arms 13 are located at an intermediate location between the roller sub-assemblies 14 and 16 and at an end location at the second end of the inner member 30. In the slave roller assembly 8, the swing arms 13 are located at an intermediate location between the roller sub-assemblies 14 and 16 and at opposite end locations of the inner member 130. The pivoting swing arms 13 allow each inner member 130 to move in unison horizontally and vertically relative to the outer housing 20 upon pivotal movement of the lower bell crank linkage 9.

The master and slave roller assemblies 6, 8 are connected by linking means 10, preferably in the form of a linkage bar, which effects the simultaneous action of the sub-assemblies 14, 16 in both roller assemblies 6, 8.

While a pair of roller assemblies 6, 8 is exemplified in the embodiment of FIGS. 1 to 16, it would be understood that the system could equally work with a single roller assembly or three or more roller assemblies should be this necessary for different sizes of door or window panels.

The lower bell crank linkage arrangement 9 is configured such that it rotates about the pivot point 15 and is connected to the rod member 11 and driven roller sub-assembly 14A in such a manner that the rate of force applied is non-linear, i.e. a variable force, over the range of motion of the linkage assembly 9 as it is moved from one position to another. In particular, the lower bell crank linkage arrangement 9 allows the pivot points 15, 19 to follow a non-linear path while the handle 3 is manipulated. This provides an improved application of variable handle force, by way of a sinusoidal force gradient, through the handle 3 and optimised ergonomics.

Figure 8:
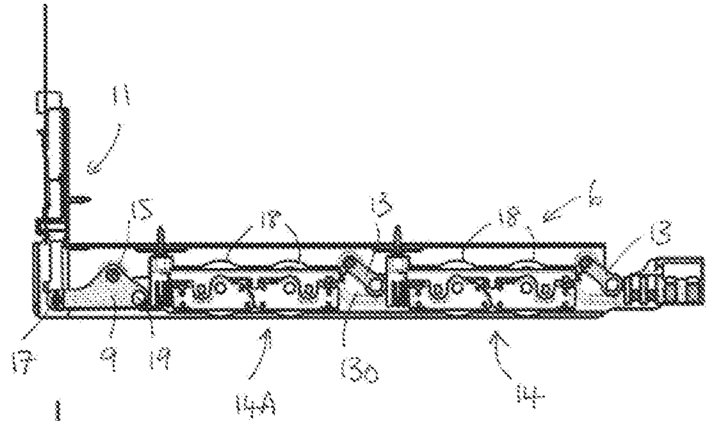
FIG. 8 is a cross-section view through line A-A of FIG. 7 of the first roller assembly in a retracted configuration.
Figure 9:
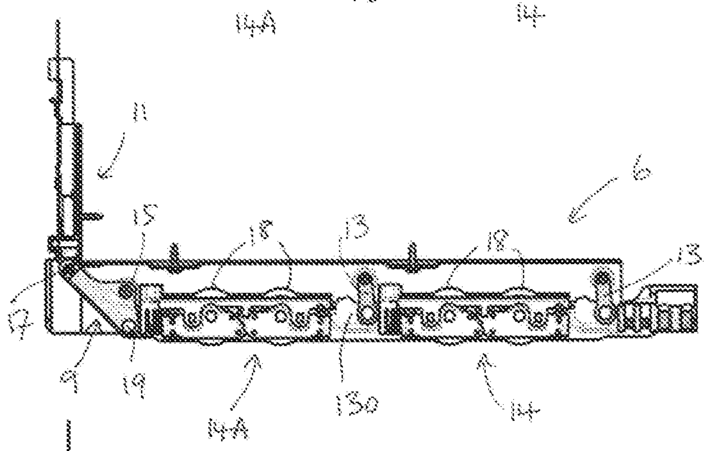
FIG. 9 is a cross-section view of the first roller assembly in an extended configuration.
Figure 10:
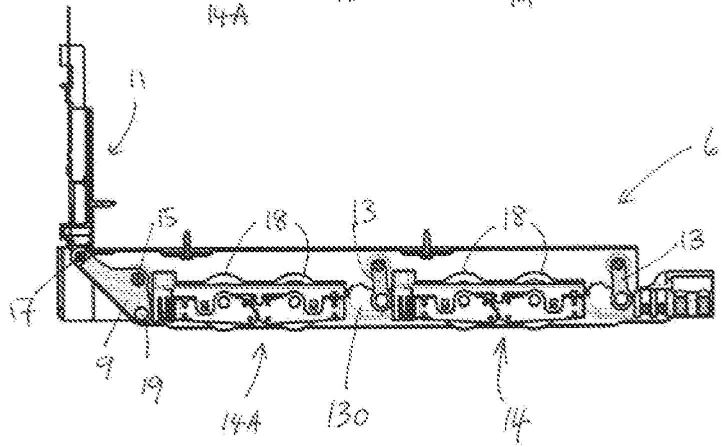
FIG. 10 is a cross-section view of the first roller assembly in an extended and loaded configuration
Figure 11:
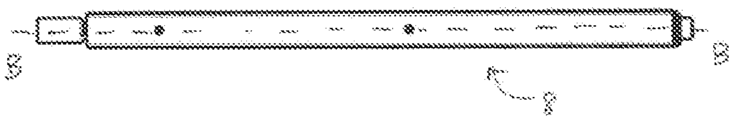
FIG. 11 is a top view of the second roller assembly of FIG. 6.
Figure 12:
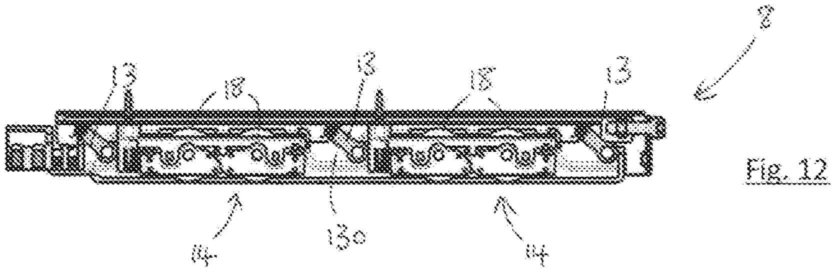
FIG. 12 is a cross-section view through line B-B of FIG. 11 of the second roller assembly in a retracted configuration.
Figure 13:
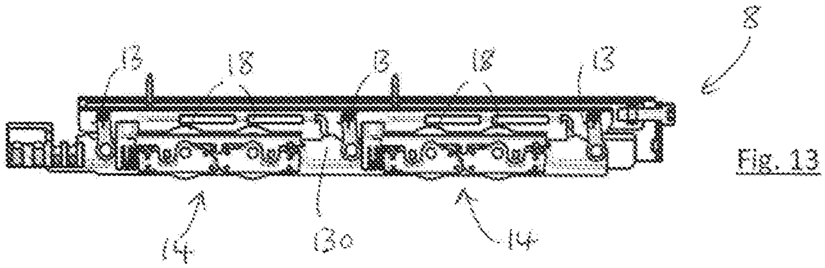
FIG. 13 is a cross-section view of the second roller assembly in an extended configuration.

In the example of FIGS. 8 to 10 the distance between the connection point 17 of the rod member 11 and the pivot point 15 is substantially double the distance between the connection point 19 of the driven roller sub-assembly 14A and the pivot point 15. It can be understood that the distances between the connection points 17, 19 and pivot point 15 can be varied to provide adjustment of the appropriate variable force through the handle 3 for optimal ergonomics.

In the embodiment of lower bell crank linkage arrangement 9 shown in FIGS. 3 and 9, the connection point 19 and pivot point 15 are substantially in vertical alignment in the extended raised position. The lower bell crank linkage arrangement 9 can optionally be configured to rotate past the vertical plane to create an over-centre lock effect which removes the constant force through the linkage 5 when it is in the raised position. This advantageously increases the product durability and lifespan. In the retracted lowered position of FIGS. 2 and 8, the connection points 17, 19 are substantially in horizontal alignment.

In the master roller assembly 6 shown more particularly in FIGS. 5, 7 to 10 and 15, each roller sub-assembly 14, 14A is mounted to the inner housing member 130 which is movable within the outer housing 20. A first end 31 of the inner housing member 30 is connected to the lower bell crank linkage 9 at connection point 19, and a second end 32 of the inner housing member 31 is connected to a first end of the linkage bar 10. The inner housing member 30 is connected to the outer housing 20 by the pivoting swing arms 13 provided at an intermediate location between the roller sub-assemblies 14 and 14A and at an end location at the second end of the inner housing member 30. The pivoting swing arms 13 allow the inner housing member to move horizontally and vertically relative to the outer housing 20 upon pivotal movement of the lower bell crank linkage 9.

In the slave roller assembly 8 shown more particularly in FIGS. 6, 11 to 14 and 16, each roller sub-assembly 14 is mounted to the inner housing member 130 which is movable relative to the upper and lower outer housing parts 20', 22. A first end 34 of the inner housing member 130 is connected to a second end of the linkage bar 10, and a second end 34 of the inner housing member 130 is a free end. The inner housing member 130 is connected to the outer housing 20 by pivoting swing arms 13 disposed at end locations at the first and second ends 34, 35 of the inner housing member 33 and at an intermediate location between the roller sub-assemblies 14. The pivoting swing arms 13 allow the inner housing member to move horizontally and vertically relative to the outer housing 20 upon horizontal movement of the linkage bar 10.

As shown in FIGS. 7 to 16 each roller assembly is configured to carry four roller wheels and has a pair of roller sub-assemblies 14, 14A, each sub-assembly 14, 14A including a pair of roller wheels 18, Each roller sub-assembly includes a support 22 and a pair of pivotal arms 24 where each pivotal arm 24 is arranged to mount a respective roller wheel 18. Each pivotal arm 24 is pivotally attached to the support 40 at one end to permit the respective roller wheel 18 to pivot relative to the support 1 in a vertical plane. The roller sub-assembly 14,14A also includes suspension means 26 for connecting the opposite end of the pivotal arm 24 to the support to allow suspension of the roller wheel 18 relative to the outer housing 20. As a result, in use when the load of the slidable panel 4 rests on the roller assembly 6, 8, the roller wheel 18 recedes a pre-determined amount into the outer housing 20 compared to when the roller assembly 6, 8 is unloaded. This is particularly illustrated in FIGS. 4, 10 and 14 where the roller wheels 18 recede into the body of the roller assemblies 14, 14A in the loaded configurations compared to those of the unloaded configurations shown in FIGS. 3, 9 and 13. Further details of the suspension means comprising the pivotal arm 24 and resilient member 26 are provided in a related patent application.

In one embodiment exemplified in FIGS. 8 to 16, the roller assemblies 6, 8 are each configured to carry four roller wheels 18, and have a pair of roller sub-assemblies 14, each of which includes a support 22 attached to the inner housing member 130 and which can carry two roller wheels 18. Each roller sub-assembly 14 has a pair of pivotal arms 24, each pivotal arm 24 being adapted to receive a respective roller wheel 18 to allow rotational movement such that the wheels 18 can rotate to allow movement of the slidable panel 4 within the sill during operation.

Each of the roller wheels 18 includes an outer wheel surface which is adapted to engage the recessed sill when in use. The pivotal arms 24, which can be formed of a pair of parallel spaced-apart elongate plate-like members, hold the roller wheel 18 therebetween, either by inwardly directed protrusions or by an axle 32 of the roller wheel 18 which extends through centrally located apertures in the pivotal arms 24.

Figure 17:
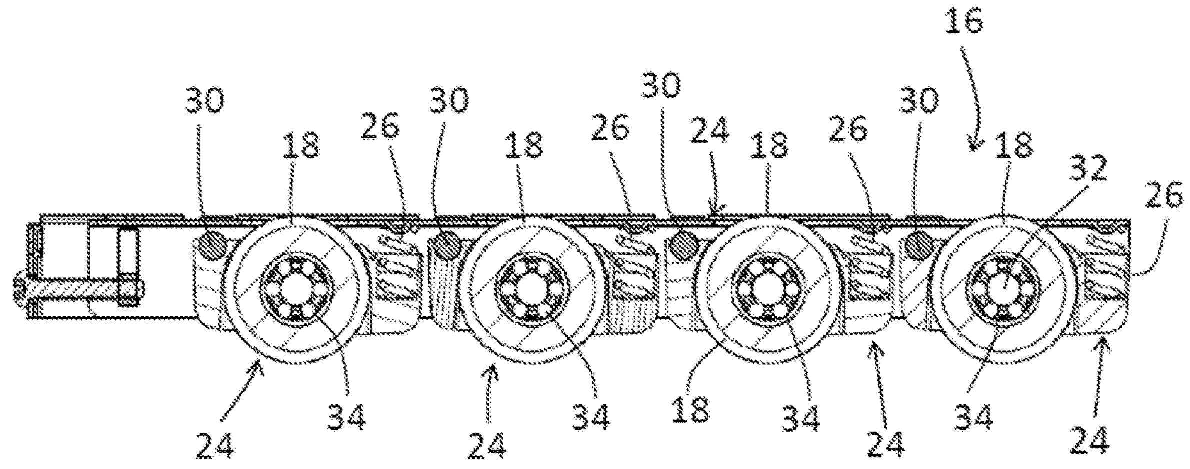
FIG. 17 is a sectional view of an alternative roller assembly having four individual roller wheel cartridges for use in the sealing assembly of FIGS. 1 to 4.
Figure 18:
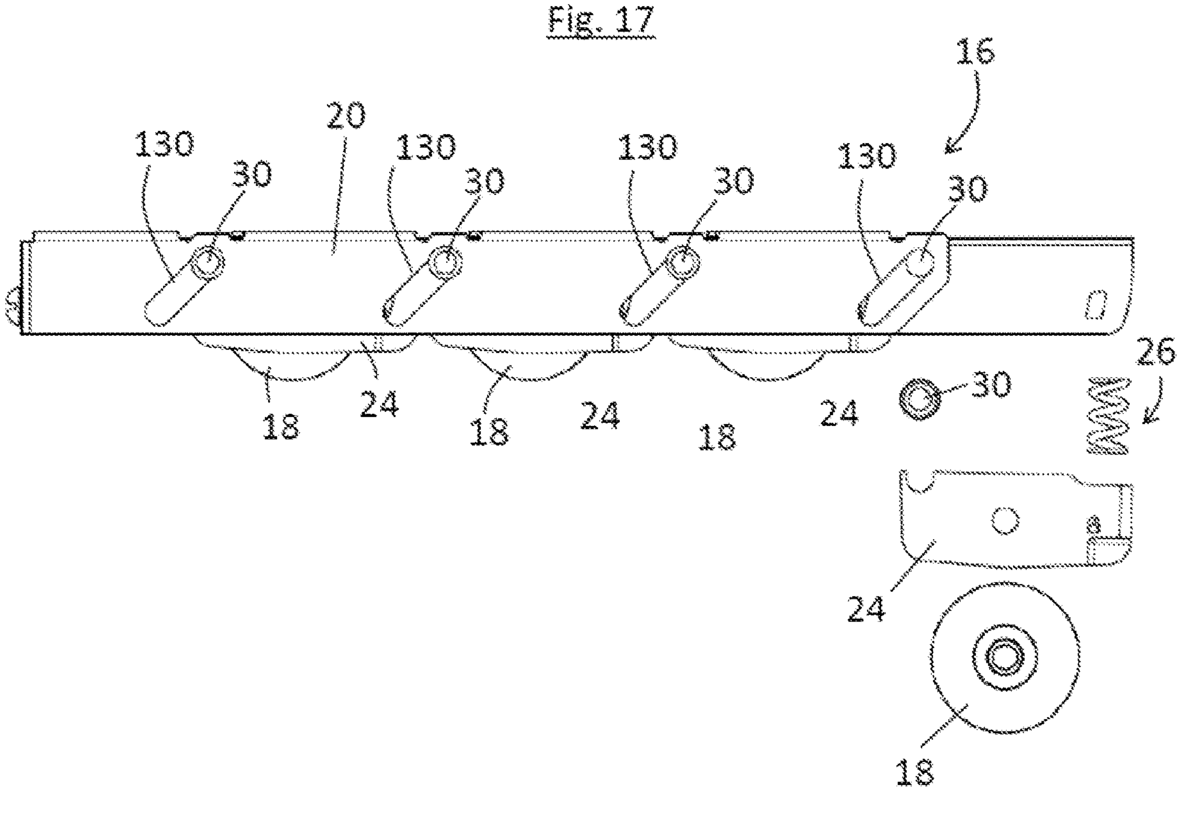
FIG. 18 is a side view of the alternative roller assembly of FIG. 17 including an exploded view of one of the removable roller cartridge assemblies.

In another embodiment exemplified in FIGS. 17 and 18, each roller assembly 6, 8 has a single roller sub-assembly 16 in which the inner housing member 130 forms a single support 22 which is configured to carry four wheels 18. The roller sub-assembly 16 includes four pivotal arms 24, each of which is adapted to receive a single roller wheel 18 to allow rotational movement so that the wheels 18 can rotate to allow the panel 4 to slide within the sill during use. Similar to the embodiment of FIGS. 7 to 16, each pivotal arm 24 is pivotally attached to the support 22 at one end and has a suspension means 26 at the opposite end of the pivotal arm 24 with the roller wheel 18 being mounted intermediate the ends. In use, the sub-assembly 16 is arranged such that the roller wheels 18 form a horizontal row, with each pivotal arm 24 forming its own suspension arrangement as the arms 24 are each pivotally attached about its own pivot 30, the four pivot points 30 being equidistantly spaced apart from each other such that the suspension means 26 is adjacent the subsequent suspension arrangement. The suspension means 26 are shown in the embodiment of FIGS. 17 to 18 as springs, specifically coil springs however it would be understood that any type of resilient suspension means would be able to be used.

Referring to FIG. 18, instead of the swinging arms 13 of the embodiment of FIGS. 7 to 16, the sides of the outer housing 20 have four inclined slots 113. The pivot pin 30 for each pivotal arm 24 is received and movable within a respective slot 113, so as to allow the inner housing member 130 to move horizontally and vertically relative to the outer housing 20 upon pivotal movement of the lower bell crank linkage 9, thereby allowing the roller wheels 18 to move between their retracted and extended positions within the outer housing 20

The roller wheels 18, as illustrated in FIG. 17 in cross-section, each include a plurality of internal bearings 34. The bearings 34 may reduce rotational friction and can help the wheel 18 to support radial and axial loads. Other type of roller wheels 18 can be utilised in the roller assemblies 6, 8 depending on the nature of use and load to be carried by each roller wheel 18.

In addition, each of the sub-assemblies 14, 14A described above may also be configured so as to be removably attachable to the body of the roller assembly. Therefore, the sub-assemblies 14, 14A may be in form of a cartridge type assembly. For instance, in the case of the embodiment illustrated in FIGS. 15 and 16, the body of each roller assembly 6, 8 may be arranged to receive two removable cartridge sub-assemblies 14 which can carry two roller wheels each.

Alternatively, as illustrated in FIGS. 17 to 18, the roller assembly 16 carries four roller sub-assemblies in the form of removably attachable cartridges, each of which comprises a pivotal arm 24, a roller wheel 18 and suspension means 26.

The removable and re-attachable cartridge-type sub-assemblies 14, 16 advantageously allow easy replacement and maintenance. In addition, the removably attachable sub-assemblies 14, 16 allow the number of roller wheels 18 in the roller assembly to be modified as required. For instance, if heavier panels 4 are to be used, then the number of roller wheels 18 can be increased by the attachment of a second or more in the sub-assembly 14, 16. Furthermore, the placement of the roller wheel sub-assemblies 14, 16 within the roller assembly 4, 6 can be modified so as to optimise the load distribution from the sliding panel 4 such that it is spread evenly across the roller assemblies 14, 16, and also the roller wheels 18. Finally, a sub-assembly 14, 16 may be replaced by one with different specifications, i.e. different suspension means such as different resilient means, stronger or weaker coil springs, or roller wheels with different bearings etc.

The roller wheels 18 can also be configured to be removable from the roller sub-assemblies 14, 16 for the purposes of optimal load distribution. For example, one of the roller wheels 18 can be removed from the roller sub-assembly 14A, 14 so that it has only one roller wheel. Even with one roller wheel 18 in the roller sub-assembly 14A, 14, the roller sub-assembly 14A, 14 is still able to fully function in the roller assembly as described above, but ability to add or remove roller wheels 18 as required assists in load distribution.

A portion 40 of each cartridge-type sub-assembly 14, 16 can be arranged so as to be received in a correspondingly sized recess portion 42 of the roller assembly 4, 6 so as to ensure a tight fit (or vice versa), and can be fixed into the roller assembly 4, 6 by fixing means, for example a screw 44, although other releasable fastenings could be used such as a resilient protrusion and recess arrangement.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A sealing assembly for moving a slidable panel for engagement with and disengagement from sealing means, the sealing assembly comprising a linkage assembly which connects a handle and at least one roller assembly having roller wheels, the sealing assembly being configured to be adjustable, by manipulation of the handle, such that the at least one roller assembly and the slidable panel supported thereby are movable between a first position where the slidable panel is in contact with sealing means thereby providing weatherproofing and a second position where the slidable panel is free of the sealing means and the slidable panel is able to move freely relative to an outer frame, and wherein the linkage assembly is configured to as to provide a variable force through the handle when the at least one roller assembly and the slidable panel is moved between the first and second positions, wherein the at least one roller assembly includes a first roller sub-assembly and a second roller sub-assembly, wherein the at least one roller assembly has a housing and the at least one roller assembly includes the first roller sub-assembly connected to the second roller sub-assembly to move the first and second roller sub-assemblies pivotally relative to the housing, and wherein the first roller sub-assembly is connected to the second roller sub-assembly such that movement between positions of the first roller sub-assembly effects parallel movement of the second roller sub-assembly.

2. An assembly according to claim 1, wherein the first position is a lowered position of slidable panel in which the roller wheels of the at least one roller assembly are retracted into said roller assembly, and the second position is a raised position of the slidable panel in which the roller wheels are extended partly out of the roller assembly.

3. An assembly according to claim 2, wherein, in the lowered position a body of the roller assembly or each roller assembly is forced onto the sealing means by the sliding panel, and in the raised position the body of the at least one roller assembly is free of the sealing means.

4. An assembly according to claim 1 wherein the movement between the first and second positions is provided by a pair of bell crank linkage arrangements having a vertical rod member connected therebetween.

5. An assembly according to claim 4, wherein the bell crank linkage arrangements comprise an upper bell crank linkage which connects an upper end portion of the rod member to the handle and a lower bell crank linkage which connects the lower end portion of the rod member to the roller sub-assembly.

6. An assembly according to claim 5, wherein the lower bell crank linkage comprises a linkage member which is pivotally movable about a pivot point, the linkage member having a connection at one end to the rod member, and a connection at its other end to one of the roller sub-assembly.

7. An assembly according to claim 6, wherein the lower bell crank linkage is arranged such that, when the linkage member is pivoted about the pivot point, the connection of the linkage member to the roller sub-assembly moves through a non-linear path to provide a substantially sinusoidal force gradient.

8. An assembly according to claim 6, wherein the pivot point of the lower bell crank linkage is configured to be at different distances from the connections to the rod member and to the roller sub-assembly.

9. An assembly according to claim 8, wherein the distance between the connection to the rod member and the pivot point is substantially twice the distance between the connection to the roller sub-assembly and the pivot point.

10. An assembly according to claim 6, wherein in the raised position the connection point of the lower bell linkage to the roller sub-assembly is substantially in vertical alignment with the pivot point.

11. An assembly according to claim 1, comprising a plurality of roller assemblies, wherein a first roller assembly of the plurality of roller assemblies is a master roller assembly connected to the linkage assembly, and a second roller assembly of the plurality of roller assemblies is a slave roller assembly connected to the master roller assembly by a linking means such that movement between the positions of the master roller assembly effects a similar movement of the slave roller assembly, and wherein the master and slave roller assemblies are spaced apart and mountable in the recess of a sill for support of the slidable panel.

12. An assembly according to claim 5, wherein the housing is engageable with the sealing means in the first, lowered position, and the at least one roller assembly comprises an inner member movable within the housing and where the inner member carries the first roller sub-assembly and the second roller sub-assembly.

13. An assembly according to claim 12, wherein the inner member is connected to the housing such that the inner member is movable in vertical and horizontal directions relative to the outer housing upon pivotal movement of the lower bell crank linkage.

14. An assembly according to claim 13, wherein the connection between the inner member and the housing comprises at least one pivoting swing arm.

15. An assembly according to claim 13, wherein the connection between the inner member and the housing comprises at least one pivot pin received in at least one inclined slot in the outer housing.

16. An assembly according to claim 1, wherein each roller sub-assembly is configured to hold two or four roller wheels in edge-to-edge configuration, each roller wheel being carried by a respective pivotal arm.

17. An assembly according to claim 16, wherein the pivotal arms of the roller sub-assemblies extend outwardly from each other such that they pivot in a vertical plane about a common pivot point, and wherein each arm has a suspension means located at an opposite end portion of said arm from the common pivot point.

18. An assembly according to claim 16, wherein any of the roller wheels in the roller sub-assembly or each roller sub-assembly is configured so as to be removable and/or replaceable for adjustment of load distribution.

19. An assembly according to claim 18, wherein the at least one roller sub-assembly is removable and/or replaceable.

* * * * *